J. H. Britton.
Rim Press and Tire Heater.
Nº 95,420. Patented Oct. 5, 1869.
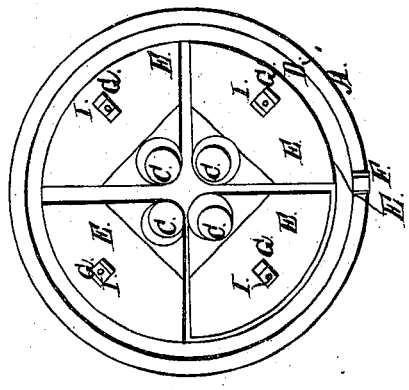
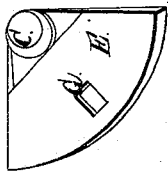
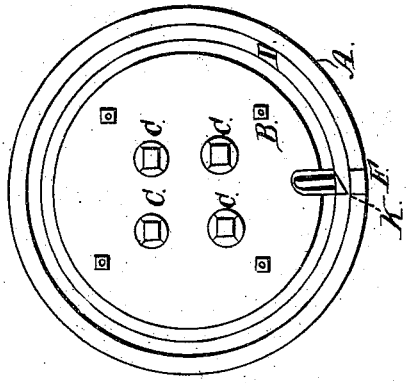
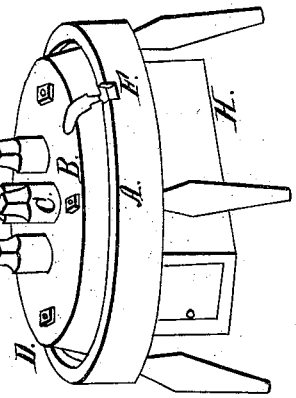
Witnesses.
Wm Pettingell
E E Gill

United States Patent Office.

J. H. BRITTON, OF PAINESVILLE, OHIO.

Letters Patent No. 95,420, dated October 5, 1869.

IMPROVED RIM-PRESS AND TIRE-HEATER.

The Schedule referred to in these Letters Patent and making part of the same.

*To all whom it may concern:*

Be it known that I, J. H. BRITTON, of Painesville, in the county of Lake, and State of Ohio, have invented a Combined Rim-Press and Tire-Heater; and I do hereby declare the following is a full and exact description thereof, which will enable those skilled in the art to make and use the same, reference being had to the accompanying drawings, and letters of reference marked thereon, in which—

Figure I is a perspective view of my invention, complete in all its parts.

A is a form, made of iron, the inner circumference of which is a true circle.

B, a cover, to confine the cam-pins C C in their place, and also the clamps E are kept in position, by the cover B being firmly secured by the nuts on its upper side.

C C, cam-pins, the use of which will be described.

D, rim, in position in the former.

H, furnace to heat the form.

Figure II, a plan view, showing the former A, cover B, cam-pins C C C C, hoop D, channel F, the use of which will be described, and bevelled joint of rim, shown by letter K.

Figure III, view, with cover B removed to show the clamps E E E E, cam-pins C C C C, slots G G G G, guide-pins I I I I, rim D, and channel F. The lap bevel-joint in rim, is shown by letter K.

Figure IV, clamp E, showing slot G and cam-pin C.

Figure V, cam-pin C.

The letters of reference indicate similar parts in all the figures.

This invention is for making and tiring a rim made of a length of rounded wood.

The tire is coved in a die, to conform to the outer circumference of the rim.

The operation of my invention is thus:

The former A is first heated by the furnace H. When sufficiently hot, the tire is placed in the former A, said tire being cut of a desired length to allow of a sufficient lap. The rim is then placed in the form inside the tire, the stick composing the rim having bevelled lap-joints cut on both ends, to match and make a close joint when closed together.

The position of the rim is shown, by letter D, in Fig. III, in the former A; the bevel lap-joints shown by letter K. After the rim and tire are placed in position, the clamps E E E E are forced against the inner surface of the rim, pressing the rim into the cove in the tire, by the act of turning the cam-pins C C C C. In Fig. III one of the clamps is shown as carried back by reversing the action of the cam-pin C. After the rim is secured between the clamps firmly, so that the bevel-joints are closed and the rim well pressed into the tire, both are riveted at once, by passing the rivet, which is made with a head to conform to the shape of the inner surface of the rim, through both rim and tire from the inside. The rivet is then headed down, by placing a lever or any other suitable device, to hold it firmly in position while riveting. The channel F allows room to pass the rivet through the hole in the rim and tire.

The rivet-hole is drilled through both rim and tire at one operation, and while both are secured in the former A.

The advantage of making and tiring a rim by the use of my invention is, that the tire, by my process of securing and heating it, makes a perfectly-close and rigid connection between the rim and tire, the heat expands the iron in a short time, and while the other acts of the process are being performed, by the time the riveting is completed, the iron is sufficiently expanded to close firmly on the rim after cooling.

The following is a description of the construction and operation of my invention:

The former A is composed of iron, with its interior circumference a true circle. The bottom is also iron. It is heated by the furnace H, which is placed beneath. The former A has placed in its interior, and working on the slide-pins I, four quadrant-shaped clamps, as shown in Fig. III, which, when combined, form a circle, and, when forced out, fill the interior circumference of the rim, which is placed in the former. Each clamp is formed of a quarter of a circle, with a metal strap attached to the sides, and bent to conform to the shape of the cam-pin C, as shown in Fig. IV. The action of the pins, in adjusting the clamps E, is easily seen. The pin is turned, with the swell of the cam, outward, to act on the inside edge of the clamp, pressing them against the rim. To loosen the rim, the pins are turned back, with the swell, against the metal strap, which draws the clamp away from the rim.

The four cam-pins C are pivoted in holes in the bottom of the former A, their shafts rising through the cover B, thus keeping them steady and forming a guide.

What I claim as my invention, and desire to secure by Letters Patent, is—

A combined heating and expanding-apparatus, consisting of the former A, cap B, cam-pins C, clamps E, slots F and G, furnace H, or its equivalent, and pins I, all constructed as described, and for the purpose as set forth.

J. H. BRITTON.

Witnesses:
WM. PETTINGELL,
E. E. GILL.